US010229172B2

(12) United States Patent
Mochizuki (10) Patent No.: US 10,229,172 B2
(45) Date of Patent: Mar. 12, 2019

(54) INFORMATION PROCESSING DEVICE, INFORMATION PROCESSING METHOD, AND INFORMATION PROCESSING PROGRAM (71) Applicant: Rakuten, Inc., Tokyo (JP)

(72) Inventor: Daisuke Mochizuki, Tokyo (JP)

(73) Assignee: Rakuten, Inc., Tokyo (JP)

( * ) Notice: Subject to any disclaimer, the term of this patent is extended or adjusted under 35 U.S.C. 154(b) by 227 days.

(21) Appl. No.: 15/024,478

(22) PCT Filed: Sep. 30, 2013

(86) PCT No.: PCT/JP2013/076549
§ 371 (c)(1),
(2) Date: Mar. 24, 2016

(87) PCT Pub. No.: WO2015/045158
PCT Pub. Date: Apr. 2, 2015

(65) Prior Publication Data
US 2016/0232215 A1 Aug. 11, 2016

(51) Int. Cl.
*G06F 17/30* (2006.01)
(52) U.S. Cl.
CPC .. *G06F 17/30554* (2013.01); *G06F 17/30551* (2013.01); *G06F 17/30719* (2013.01)
(58) Field of Classification Search
CPC ...................................... G06F 17/30
USPC ........................................ 707/722
See application file for complete search history.

(56) References Cited

U.S. PATENT DOCUMENTS

| 7,744,073 B2* | 6/2010 | Iguchi | B65H 37/04 270/20.1 |
|---|---|---|---|
| 7,946,568 B2* | 5/2011 | Hayashi | B65H 37/04 270/58.11 |
| 8,109,497 B2* | 2/2012 | Okamoto | B65H 37/04 270/20.1 |
| 8,260,874 B1* | 9/2012 | Hammond | G06F 17/30867 707/705 |
| 8,538,892 B2* | 9/2013 | Humpleman | G06Q 20/382 705/14.38 |
| 9,101,397 B2* | 8/2015 | Guthart | A61B 8/12 |
| 9,892,120 B2* | 2/2018 | Lee | G06F 17/30038 |

(Continued)

FOREIGN PATENT DOCUMENTS

| JP | 5-314732 A | 11/1993 |
|---|---|---|
| JP | 2006-155125 A | 6/2006 |

OTHER PUBLICATIONS

International Search Report for PCT/JP2013/076549 dated Nov. 19, 2013 [PCT/ISA/210].

*Primary Examiner* — Kim T Nguyen
(74) *Attorney, Agent, or Firm* — Sughrue Mion, PLLC (57) ABSTRACT

A terminal Tn retrieves a last viewing end date and time and a last viewing end position that are associated with the content ID of content selected by a user. From among a plurality of texts contained in the content, the terminal Tn determines a range that is based on the last viewing end position and that depends on the elapsed time from the last viewing end date and time to the current time, to be coverage for generating a summary of the content. Then, the terminal Tn generates a summary of the determined coverage and presents the generated summary to the user.

19 Claims, 6 Drawing Sheets

(56) References Cited

U.S. PATENT DOCUMENTS

2004/0201633 A1* 10/2004 Barsness ............... G06F 17/241
  715/864
2012/0210203 A1* 8/2012 Kandekar ......... G06F 17/30719
  715/230

* cited by examiner

EXAMPLE STRUCTURE OF ELECTRONIC BOOK CONTENT

| PART | CHAPTER | SECTION | CLAUSE | THE NUMBER OF PAGES |
|---|---|---|---|---|
| 1 | 1 | 1 | 1 | 1-10 |
| | | | 2 | 11-20 |
| | | | 3 | 21-30 |
| | | 2 | 1 | 31-40 |
| | | | 2 | 41-50 |
| | | | 3 | 51-60 |
| | 2 | 1 | 1 | 61-70 |
| | | | 2 | 71-80 |
| | | | 3 | 81-90 |
| | | 2 | 1 | 91-100 |
| | | | 2 | 101-110 |
| | | | 3 | 111-120 |
| | 3 | 1 | 1 | 121-130 |
| | | | 2 | 131-140 |
| | | | 3 | 141-150 |
| | | 2 | 1 | 151-160 |
| | | | 2 | 161-170 |
| | | | 3 | 171-180 |
| | 4 | 1 | 1 | 181-190 |
| | | | 2 | 191-200 |
| | | | 3 | 201-210 |
| | | 2 | 1 | 211-220 |
| | | | 2 | 221-230 |
| | | | 3 | 231-240 |
| | 5 | 1 | 1 | 241-250 |
| | | | 2 | 251-260 |
| | | | 3 | 261-270 |
| | | 2 | 1 | 271-280 |
| | | | 2 | 281-290 |
| | | | 3 | 291-300 |
| | 6 | 1 | 1 | 301-310 |
| | | | 2 | 311-320 |
| | | | 3 | 321-330 |
| | | 2 | 1 | 331-340 |
| | | | 2 | 341-350 |
| | | | 3 | 351-360 |
| | 7 | 1 | 1 | 361-370 |
| | | | 2 | 371-380 |
| | | | 3 | 381-390 |
| | | 2 | 1 | 391-400 |
| | | | 2 | 401-410 |
| | | | 3 | 411-420 |

FIG. 4

| No | CONTENT ID | VIEWING START DATE AND TIME | VIEWING END DATE AND TIME | CONTENT VIEWING TIME | VIEWING START POSITION | VIEWING END POSITION | CONTENT VIEWING AMOUNT | ELAPSED TIME | SUMMARY VIEWING TIME | INFORMATION ABOUT WHETHER BACKWARD OPERATION WAS PERFORMED |
|---|---|---|---|---|---|---|---|---|---|---|
| 1 | a-123 | 2013/9/1 18:00 | 2013/9/1 20:00 | 2 HOURS | PAGE 0 | PAGE 41 | 41 | — | — | — |
| 2 | a-123 | 2013/9/2 8:00 | 2013/9/2 9:00 | 1 HOUR | PAGE 41 | PAGE 61 | 21 | 12 HOURS | 35 SECONDS | NOT PERFORMED |
| 3 | a-123 | 2013/9/2 12:45 | 2013/9/2 12:50 | 5 MINUTES | PAGE 61 | PAGE 63 | 3 | 3 HOUR 45 MINUTES | 20 SECONDS | PERFORMED |
| 4 | a-123 | 2013/9/2 18:30 | 2013/9/2 20:00 | 1 HOUR 30 MINUTES | PAGE 63 | PAGE 78 | 16 | 5 HOUR 40 MINUTES | 5 SECONDS | NOT PERFORMED |
| 5 | b-456 | 2013/9/4 7:00 | 2013/9/4 8:00 | 1 HOUR | PAGE 0 | PAGE 21 | 21 | — | — | — |
| 6 | b-456 | 2013/9/4 12:00 | 2013/9/4 12:50 | 50 MINUTES | PAGE 21 | PAGE 35 | 15 | 4 HOURS | 35 SECONDS | NOT PERFORMED |
| 7 | a-123 | 2013/9/4 18:00 | 2013/9/4 21:00 | 3 HOURS | PAGE 35 | PAGE 107 | 73 | 46 HOURS | 10 SECONDS | NOT PERFORMED |
| 8 | a-123 | 2013/9/5 7:00 | 2013/9/5 7:30 | 30 MINUTES | PAGE 107 | PAGE 117 | 11 | 10 HOURS | 35 SECONDS | PERFORMED |
| 9 | a-123 | 2013/9/5 8:00 | 2013/9/5 9:00 | 1 HOUR | PAGE 117 | PAGE 134 | 18 | 30 MINUTES | 2 SECONDS | PERFORMED |
| ~ | ~ | ~ | ~ | ~ | ~ | ~ | ~ | ~ | ~ | ~ |
| 21 | a-123 | 2013/9/18 20:00 | 2013/9/18 23:00 | 3 HOURS | PAGE 314 | PAGE 345 | 32 | 8 HOURS | 35 SECONDS | NOT PERFORMED |
| 22 | a-123 | 2013/9/20 7:00 | 2013/9/20 8:00 | 1 HOUR | PAGE 345 | PAGE 356 | 12 | 32 HOURS | 20 SECONDS | NOT PERFORMED |
| ~ | ~ | ~ | ~ | ~ | ~ | ~ | ~ | ~ | ~ | ~ |
| n | | | | | | | | | | |

FIG. 5A

EXAMPLE SETTING OF THRESHOLD VALUES

| THRESHOLD VALUE | SETTING VALUE |
|---|---|
| THRESHOLD VALUE a | 1 HOUR |
| THRESHOLD VALUE b | 6 HOURS |
| THRESHOLD VALUE c | 24 HOURS |
| THRESHOLD VALUE d | 48 HOURS |

FIG. 5B

EXAMPLE INFORMATION INDICATING CORRESPONDENCE BETWEEN EACH PERIOD AND PARAMETERS

| PERIOD | UNIT TIME | THE NUMBER OF PAGES PER UNIT TIME | SEGMENT UNIT |
|---|---|---|---|
| FIRST PERIOD: LESS THAN THRESHOLD VALUE a | — | — | — |
| SECOND PERIOD: GREATER THAN OR EQUAL TO THRESHOLD VALUE a, LESS THAN THRESHOLD VALUE b | 1 HOUR | 5 PAGES | CLAUSE |
| THIRD PERIOD: GREATER THAN OR EQUAL TO THRESHOLD VALUE b, LESS THAN THRESHOLD VALUE c | 1 HOUR | 5 PAGES | CLAUSE |
| FOURTH PERIOD: GREATER THAN OR EQUAL TO THRESHOLD VALUE c, LESS THAN THRESHOLD VALUE d | 1 HOUR | 5 PAGES | SECTION |
| FIFTH PERIOD: GREATER THAN OR EQUAL TO THRESHOLD VALUE d | 1 HOUR | 5 PAGES | CHAPTER |

FIG. 5C

EXAMPLE INFORMATION INDICATING CORRESPONDENCE BETWEEN EACH PERIOD AND PARAMETERS

| PERIOD | UNIT TIME | THE NUMBER OF PAGES PER UNIT TIME | SEGMENT UNIT |
|---|---|---|---|
| FIRST PERIOD: LESS THAN THRESHOLD VALUE a | — | — | — |
| SECOND PERIOD: GREATER THAN OR EQUAL TO THRESHOLD VALUE a, LESS THAN THRESHOLD VALUE b | 1 HOUR | 5 PAGES | CLAUSE |
| THIRD PERIOD: GREATER THAN OR EQUAL TO THRESHOLD VALUE b, LESS THAN THRESHOLD VALUE c | 1 HOUR | 5 PAGES | CLAUSE |
| FOURTH PERIOD: GREATER THAN OR EQUAL TO THRESHOLD VALUE c, LESS THAN THRESHOLD VALUE d | 1 HOUR | 5 PAGES | SECTION |
| FIFTH PERIOD: GREATER THAN OR EQUAL TO THRESHOLD VALUE d | 1 HOUR | 5 PAGES | CHAPTER |

FIG. 5D

EXAMPLE INFORMATION INDICATING CORRESPONDENCE BETWEEN EACH PERIOD AND PARAMETERS

| PERIOD | UNIT TIME | THE NUMBER OF PAGES PER UNIT TIME | SEGMENT UNIT |
|---|---|---|---|
| FIRST PERIOD: LESS THAN THRESHOLD VALUE a | — | — | — |
| SECOND PERIOD: GREATER THAN OR EQUAL TO THRESHOLD VALUE a, LESS THAN THRESHOLD VALUE b | 1 HOUR | 5 PAGES | CLAUSE |
| THIRD PERIOD: GREATER THAN OR EQUAL TO THRESHOLD VALUE b, LESS THAN THRESHOLD VALUE c | 1 HOUR | 10 PAGES | CLAUSE |
| FOURTH PERIOD: GREATER THAN OR EQUAL TO THRESHOLD VALUE c, LESS THAN THRESHOLD VALUE d | 1 HOUR | 15 PAGES | SECTION |
| FIFTH PERIOD: GREATER THAN OR EQUAL TO THRESHOLD VALUE d | 1 HOUR | 20 PAGES | CHAPTER |

FIG. 5E

EXAMPLE INFORMATION INDICATING CORRESPONDENCE BETWEEN EACH PERIOD AND PARAMETERS

| PERIOD | UNIT TIME | THE NUMBER OF PAGES PER UNIT TIME | SEGMENT UNIT |
|---|---|---|---|
| FIRST PERIOD: LESS THAN THRESHOLD VALUE a | — | — | — |
| SECOND PERIOD: GREATER THAN OR EQUAL TO THRESHOLD VALUE a, LESS THAN THRESHOLD VALUE b | 1 HOUR | 5 PAGES | CLAUSE |
| THIRD PERIOD: GREATER THAN OR EQUAL TO THRESHOLD VALUE b, LESS THAN THRESHOLD VALUE c | 2 HOURS | 15 PAGES | CLAUSE |
| FOURTH PERIOD: GREATER THAN OR EQUAL TO THRESHOLD VALUE c, LESS THAN THRESHOLD VALUE d | 3 HOURS | 25 PAGES | SECTION |
| FIFTH PERIOD: GREATER THAN OR EQUAL TO THRESHOLD VALUE d | 4 HOURS | 35 PAGES | CHAPTER |

FIG. 5F

EXAMPLE INFORMATION INDICATING CORRESPONDENCE BETWEEN EACH PERIOD AND PARAMETERS

| PERIOD | UNIT TIME | THE NUMBER OF PAGES PER UNIT TIME |
|---|---|---|
| FIRST PERIOD: LESS THAN THRESHOLD VALUE a | — | — |
| SECOND PERIOD: GREATER THAN OR EQUAL TO THRESHOLD VALUE a, LESS THAN THRESHOLD VALUE b | 1 HOUR | 5 PAGES |
| THIRD PERIOD: GREATER THAN OR EQUAL TO THRESHOLD VALUE b, LESS THAN THRESHOLD VALUE c | 2 HOURS | 15 PAGES |
| FOURTH PERIOD: GREATER THAN OR EQUAL TO THRESHOLD VALUE c, LESS THAN THRESHOLD VALUE d | 3 HOURS | 25 PAGES |
| FIFTH PERIOD: GREATER THAN OR EQUAL TO THRESHOLD VALUE d | 4 HOURS | 35 PAGES |

FIG.6

INFORMATION PROCESSING DEVICE, INFORMATION PROCESSING METHOD, AND INFORMATION PROCESSING PROGRAM

CROSS REFERENCE TO RELATED APPLICATIONS

This application is a National Stage of International Application No. PCT/JP2013/076549, filed on Sep. 30, 2013, the contents of all of which are incorporated herein by reference in their entirety.

TECHNICAL FIELD

The present invention relates to techniques for, for example, a device that generates a summary of content containing a plurality of viewing elements viewable to a user.

BACKGROUND ART

Techniques for presenting a summary (outline) of content, such as an electronic book, are conventionally known. For example, Patent Literature 1 discloses a portable display device that retrieves outline data indicating outlined description up to the page before each page in text data from data storage means and causes display means to display the outlined content based on the retrieved outline data.

CITATION LIST

Patent Literature

Patent Literature 1: JP H05-314732 A

SUMMARY OF THE INVENTION

Technical Problem

However, for the technique disclosed in Patent Literature 1, an outline presented to a user is an outline of description contained in the range up to the page before a page when the power was turned off. That is, an outline presented to a user is uniform for each page regardless of how much time has elapsed since the user viewed it last. Thus, there may be a case where the coverage of an outline is not appropriate.

Therefore, in view of, for example, the above point, it is an object of the present invention to provide an information processing device, an information processing method, and an information processing program that are capable of determining appropriate coverage for generating a summary of content.

Solution to Problem

To solve the above problem, the invention according to claim 1 includes storage means, retrieval means, and determining means. The storage means stores a viewing end time of content and a viewing end position in the content in association with identification information of the content. The content contains a plurality of viewing elements viewable to a user. Some of the viewing elements are to be presented to a user at a time. When the content is presented to a user again, the retrieval means retrieves the viewing end time and the viewing end position that are associated with the identification information of the content. The determining means determines a range, from among a plurality of viewing elements contained in the content, to be coverage for generating a summary of the content. The range is based on the viewing end position retrieved by the retrieval means and depends on the elapsed time from the viewing end time retrieved by the retrieval means to the current time.

According to this invention, appropriate coverage for generating a summary of content can be determined.

The invention according to claim 2 is the information processing device according to claim 1 in which a plurality of viewing elements contained in the content are divided using a predetermined segment unit, and the determining means determines the coverage, based on segment ranges divided using the segment unit.

According to this invention, a better-organized summary can be generated.

The invention according to claim 3 is the information processing device according to claim 2 in which when the viewing end position retrieved by the retrieval means is in a specific segment range divided using the segment unit, the determining means determines whether to include the specific segment range in the coverage, based on at which position in the specific segment range the viewing end position is.

According to this invention, appropriate coverage can be determined based on at which position in the segment range the viewing end position is.

The invention according to claim 4 is the information processing device according to claim 2 or 3 in which the determining means sets a segment unit, depending on whether the elapsed time is greater than or equal to a first threshold value, and determines the coverage using the set segment unit.

According to this invention, which segment unit to be used can be appropriately set depending on the elapsed time.

The invention according to claim 5 is the information processing device according to any one of claims 1 to 4 in which the plurality of viewing elements are divisible into a plurality of structural units. The storage means stores each of a plurality of mutually different periods that are each between a plurality of mutually different first threshold values, a unit time, and a first number of structural units per the unit time in association with each other. When the elapsed time belongs to any of the periods, the determining means multiplies the value obtained by dividing the elapsed time by the unit time associated with the period and the first number of structural units associated with the period to calculate a second number of structural units, and determines a range of the second number of structural units starting backward relative to the viewing end position to be the coverage for generating the summary of the content.

According to this invention, coverage for generating a summary of the content can be quickly determined.

The invention according to claim 6 is the information processing device according to claim 5 in which among the plurality of periods, the period to which the elapsed time being relatively long belongs is assigned the greater first number of structural units than the period to which the elapsed time being relatively short belongs.

According to this invention, coverage appropriate for each user can be set depending on the elapsed time.

The invention according to claim 7 is the information processing device according to any one of claims 4 to 6 in which when the content is presented to a user again, the retrieval means retrieves the user's viewing history of summaries of predetermined content. The information processing device further includes determination means and setting means. The determination means determines whether the user attaches importance to summaries, based on the viewing history retrieved by the retrieval means. The setting means sets the threshold value greater than a default value, if the determination means determines that the user does not attach importance to summaries.

According to this invention, coverage that makes summaries more necessary for the user can be set.

The invention according to claim 8 is the information processing device according to any one of claims 4 to 6 in which when the content is presented to a user again, the retrieval means retrieves the user's viewing history of predetermined content. The information processing device includes determination means and setting means. The determination means determines whether, after viewing a summary of the predetermined content, the user performed an operation to return to the viewing element that the user had already viewed, based on the viewing history retrieved by the retrieval means. The setting means sets the threshold value smaller than a default value, if the determination means determines that the user performed the operation to return to the viewing element that the user had already viewed.

According to this invention, appropriate coverage that depends, for example, on differences in memory among users or on the condition of the user who is viewing the content can be set.

The invention according to claim 9 is the information processing device according to claim 8 including second setting means. The second setting means sets or changes the first threshold value for each piece of content on which it is determined that the user performed the operation to return to the viewing element that the user had already viewed or for each genre to which the content belongs, based on the user's viewing history of the predetermined content.

According to this invention, more appropriate coverage can be set in accordance with how the user has viewed the content.

The invention according to claim 10 is the information processing device according to any one of claims 1 to 9 in which when the content is presented to a user again, the retrieval means retrieves a last viewing time or a last viewing amount of the content. If the last viewing time or the last viewing amount that is retrieved by the retrieval means is less than or equal to a predetermined value, the determining means determines the coverage dependent on the elapsed time from the viewing end time before the viewing end time nearest to the current time to the current time, among a plurality of the viewing end times associated with the identification information of the content.

According to this invention, appropriate coverage that depends on the content viewing time or the content viewing amount can be set.

The invention according to claim 11 is the information processing device according to claim 10 including third setting means. The third setting means sets the second threshold value, based on the user's average content viewing time or average content viewing amount.

According to this invention, more appropriate coverage can be determined in accordance with the user's viewing status.

The invention according to claim 12 is the information processing device according to any one of claims 1 to 11 in which when the content is presented to a user again, the retrieval means retrieves a current estimated viewing range of the content. The information processing device includes generating means. The generating means generates a summary of the coverage determined by the determining means, by using nouns included both in the viewing elements of the estimated viewing range retrieved by the retrieval means and in the viewing elements of the coverage.

According to this invention, a summary that allows the user to easily enter into what he or she is about to view can be generated.

The invention according to claim 13 is an information processing method performed by a computer. The method includes the following steps. A viewing end time of content and a viewing end position in the content are stored in association with identification information of the content. The content contains a plurality of viewing elements viewable to a user. Some of the viewing elements are to be presented to a user at a time. When the content is presented to a user again, the viewing end time and the viewing end position that are associated with the identification information of the content are retrieved. From among a plurality of viewing elements contained in the content, a range is determined to be coverage for generating a summary of the content. The range is based on the viewing end position and depends on the elapsed time from the viewing end time to the current time.

An information processing program according to claim 14 causes a computer to function as storage means, retrieval means, and determining means. The storage means stores a viewing end time of content and a viewing end position in the content in association with identification information of the content. The content contains a plurality of viewing elements viewable to a user. Some of the viewing elements are to be presented to a user at a time. When the content is presented to a user again, the retrieval means retrieves the viewing end time and the viewing end position that are associated with the identification information of the content. The determining means determines a range, from among a plurality of viewing elements contained in the content, to be coverage for generating a summary of the content. The range is based on the viewing end position retrieved by the retrieval means and depends on the elapsed time from the viewing end time retrieved by the retrieval means to the current time.

Advantageous Effects of the Invention

According to the present invention, appropriate coverage for generating a summary of content can be determined.

BRIEF DESCRIPTION OF THE DRAWINGS

FIG. 5A is a diagram showing an example setting for threshold values a to d.

FIGS. 5B to 5F are each a diagram showing example information indicating the correspondence between a period corresponding to each of a plurality of levels of set threshold ranges and parameters for the period.

DESCRIPTION OF EMBODIMENTS

The following describes an embodiment of the present invention with reference to the drawings. In the embodiment described below, the present invention is applied to a content providing system.

1. Configuration and Functional Overview of Content Providing System

Figure 1:
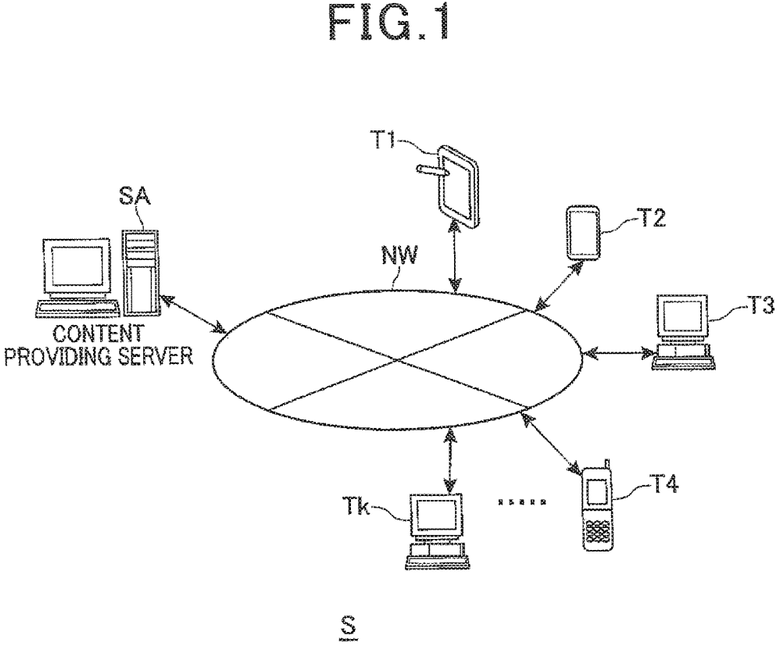
FIG. 1 is a diagram schematically showing an example configuration of a content providing system S according to this embodiment.

First, a configuration and a functional overview of a content providing system S according to this embodiment is described with reference to FIG. 1. FIG. 1 is a diagram schematically showing an example configuration of the content providing system S according to this embodiment. As shown in FIG. 1, the content providing system S includes a content providing server SA and a terminal Tn (n=1, 2, 3 . . . k). The terminal Tn is an example of an information processing device according to the present invention. The terminal Tn is capable of connecting to the content providing server SA via a network NW. The network NW includes, for example, the Internet, a mobile communication network (including base stations), and a gateway. The content providing server SA is a server that manages content and that provides the content to the terminal Tn.

Figure 2A:
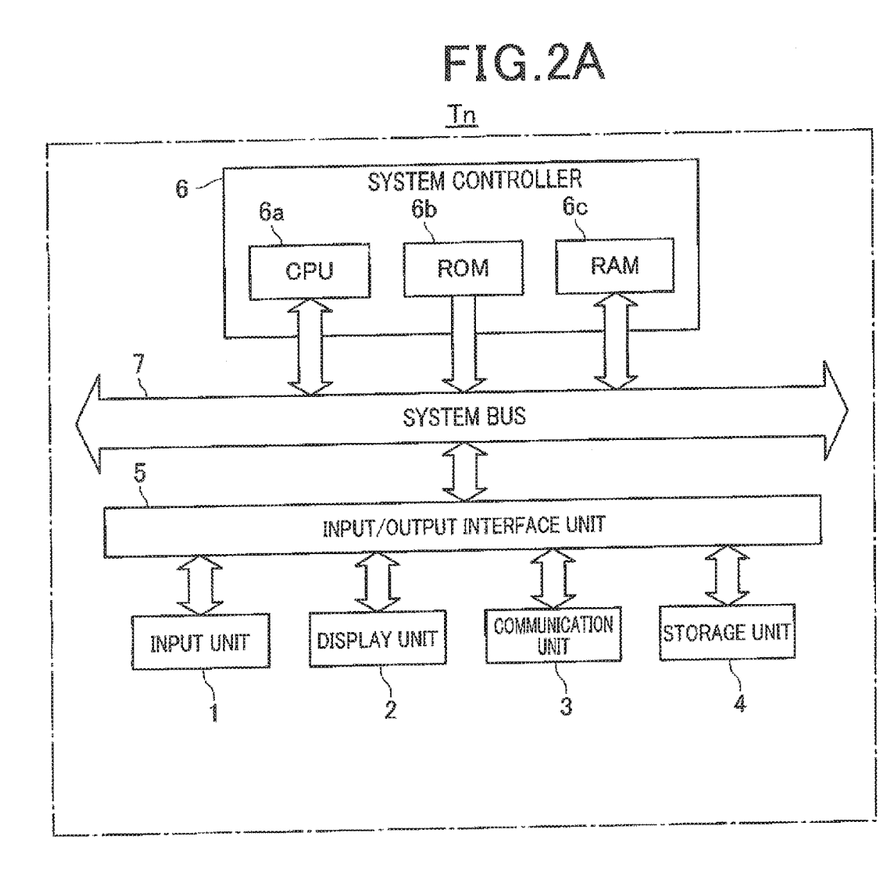
FIG. 2A is a block diagram schematically showing an example configuration of a terminal Tn according to this embodiment.

FIG. 2A is a block diagram schematically showing an example configuration of the terminal Tn according to this embodiment. As shown in FIG. 2A, the terminal Tn includes, for example, an input unit 1, a display unit 2, a communication unit 3, a storage unit 4, an input/output interface unit 5, and a system controller 6. The system controller 6 and the input/output interface unit 5 are connected via a system bus 7. The user terminal Tn may be, for example, a dedicated terminal for electronic books, a personal computer (PC), a mobile phone, a personal digital assistant (PDA), a handheld device (smartphone) combining a mobile phone and a personal digital assistant, a tablet, or a terminal device such as a handheld game console.

The input unit 1 includes, for example, a keyboard, a mouse, or a touch screen. When a user operates the input unit 1, an operating signal corresponding to the operation is output to the system controller 6. The display unit 2 includes a display having a display screen that displays various information. This display may be a touch screen type. The communication unit 3 is capable of connecting to the network NW via a wired or wireless link.

The storage unit 4 includes, for example, hard disk drives. The storage unit 4 stores various programs, such as an operating system and a content presentation program (including an information processing program according to the present invention). The storage unit 4 is an example of storage means of the present invention. The content presentation program is, for example, an application program. The content presentation program is downloaded from, for example, a predetermined server over the network NW. Alternatively, the content presentation program may be stored in and read from a (computer-readable) recording medium, such as a compact disc (CD), a digital versatile disc (DVD), or a portable semiconductor memory.

The storage unit 4 also stores a plurality of pieces of content downloaded, for example, from the content providing server over the network NW. Each piece of content is assigned a content ID as identification information identifying the content. Such content is content that contains a plurality of viewing elements viewable to a user. Some of the viewing elements are to be presented to the user via the display unit 2 at a time. In this embodiment, electronic book content that contains a plurality of viewing elements divisible into a plurality of structural units is taken as an example. The structural units correspond to, for example, pages, paragraphs, or lines. The electronic book content has a plurality of pages. The electronic book content includes structural data that specifies the structure of the content, text data that specifies a plurality of texts (character strings) contained in the content, metadata about the content, and other data. Each text is an example of a viewing element viewable to a user of the terminal Tn. The plurality of texts are divided using a predetermined segment unit. There are some types of segment units, such as Part, Chapter, Section, and Clause. The widths of segment ranges divided using a segment unit vary depending on whether the type of the segment unit is Part, Chapter, Section, or Clause. The segment unit is specified by the structural data. The text data also specifies, for example, what part of speech (e.g., a noun, an adjective, or a verb) each word constituting the texts is.

Figure 3:
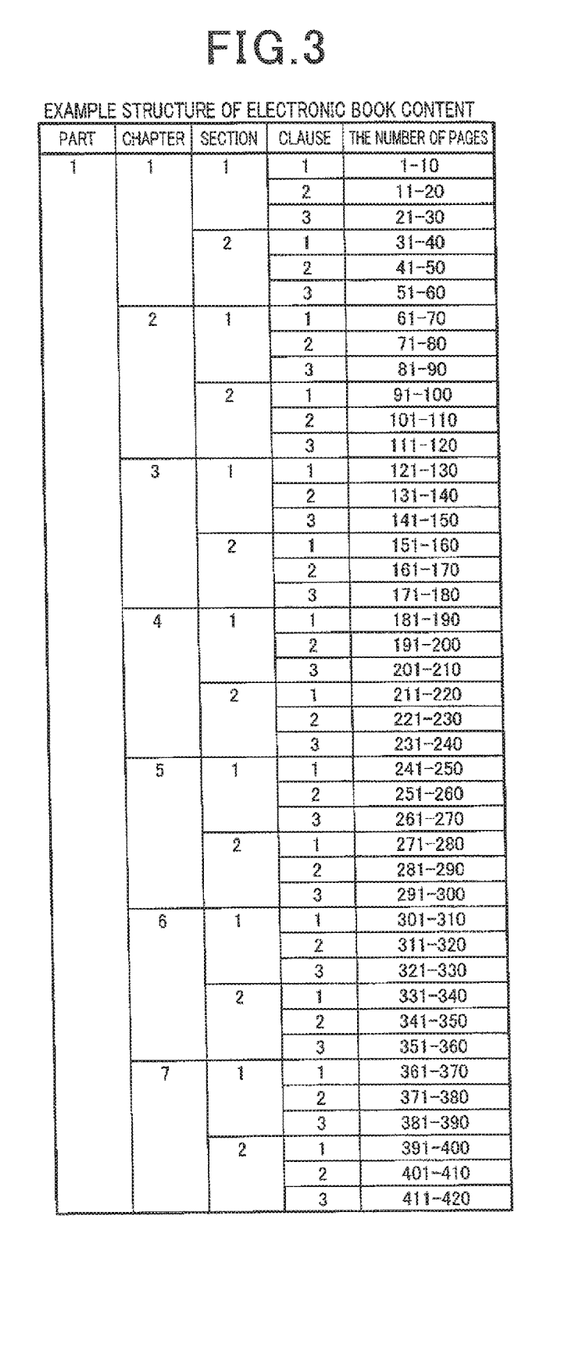
FIG. 3 is a diagram showing an example structure of electronic book content.

FIG. 3 is a diagram showing an example structure of electronic book content. In the example of FIG. 3, Part 1 of the electronic book content has 420 pages and each page contains one or more texts. Also in the example of FIG. 3, the texts contained in Part 1 of the content are divided into seven chapters, the texts contained in each chapter of the content are divided into two sections, and the texts contained in each section are divided into three clauses. The electronic book content is displayed, for example, one or two pages at a time on the display screen, thus being presented to the user.

The storage unit 4 further stores a viewing history table. The viewing history table is a table for storing a history of viewing content (hereinafter, referred to as a "content viewing history") and a history of viewing summaries of the content (hereinafter, referred to as a "summary viewing history") in association with the corresponding content ID.

Figure 4:
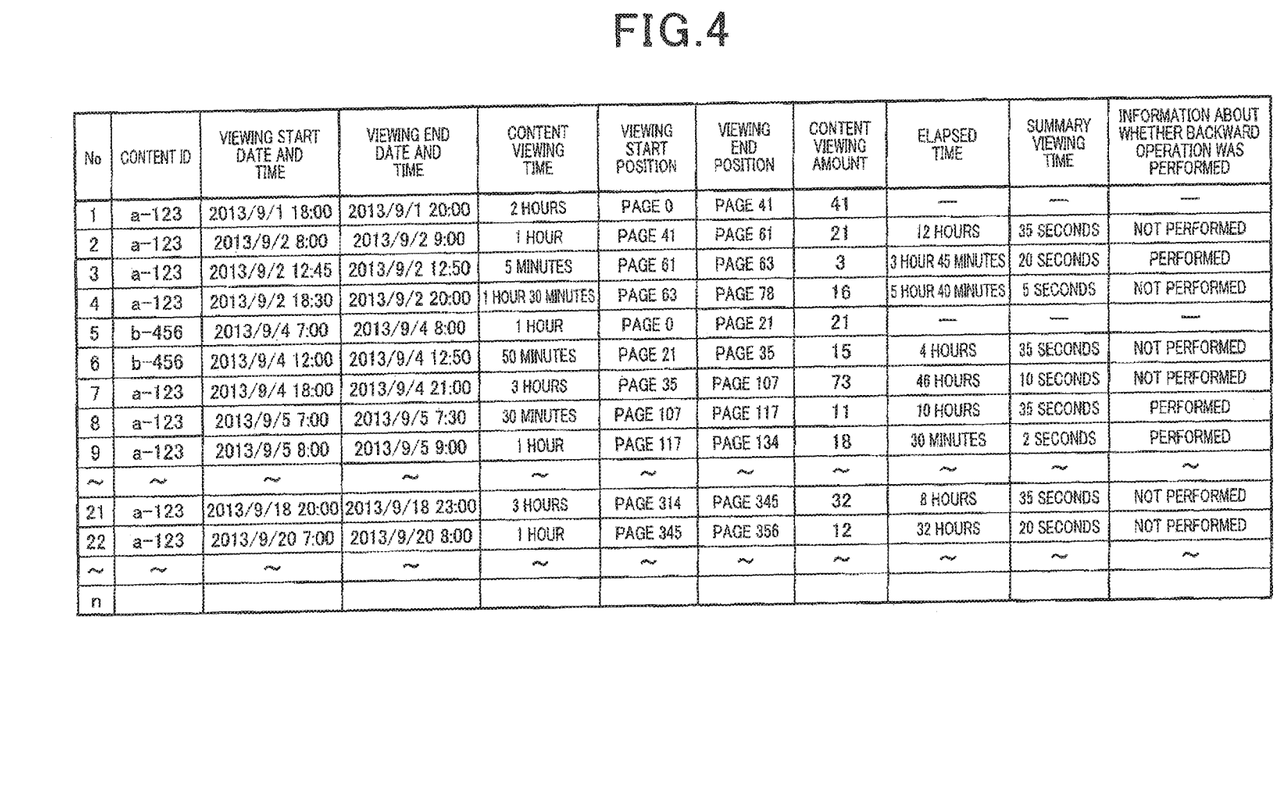
FIG. 4 is a diagram showing an example of a content viewing history and a summary viewing history that are stored in a viewing history table.

FIG. 4 is a diagram showing an example of the content viewing history and the summary viewing history that are stored in the viewing history table. The viewing history table shown in FIG. 4 stores a record number (No), a content ID, a viewing start date and time, a viewing end date and time, a content viewing time, a viewing start position, a viewing end position, a content viewing amount, an elapsed time, a summary viewing time, information about whether a backward operation was performed after summary viewing, and other information, in association with each other. The viewing start date and time is a date and time at which the user started to view content, which may include a year and month. The viewing end date and time is a date and time at which the user stopped viewing the content, which may include a year and month. The content viewing time is the time from the viewing start date and time to the viewing end date and time in a record with the same number. The viewing start position is a position (e.g., a page, a paragraph, or a line) at which the user started to view the content. The viewing end position is a position (e.g., a page, a paragraph, or a line) at which the user stopped viewing the content. The content viewing amount is the amount (e.g., the number of pages, paragraphs, or lines) from the viewing start position to the viewing end position in a record with the same number. The elapsed time is the time from the last viewing end date and time (e.g., in the record No. 1) to the current viewing start date and time (e.g., in the record No. 2). The summary viewing time is how much time the user spent on viewing. The information about whether a backward operation was performed after summary viewing indicates whether, after viewing a summary of the content, the user performed an operation to return to a page that the user had already viewed. The content viewing history and the summary viewing history are stored in the viewing history table, for example, during execution of the content presentation program.

Figure 2B:
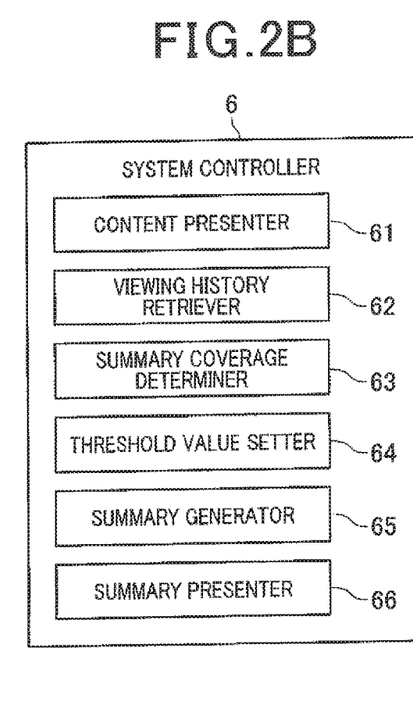
FIG. 2B is a diagram showing example functional blocks in a system controller 6.

The system controller 6 includes, for example, a central processing unit (CPU) 6a, a read only memory (ROM) 6b, and a random access memory (RAM) 6c. The system controller 6 has a clock function. FIG. 2B is a diagram showing example functional blocks in the system controller 6. The system controller 6 as a computer performs a content presentation process described later, in accordance with the content presentation program stored in the storage unit 4. In this content presentation process, as shown in FIG. 2B, the system controller 6 functions, for example, as a content presenter 61, a viewing history retriever 62, a summary coverage determiner 63, a threshold value setter 64, a summary generator 65, and a summary presenter 66. The viewing history retriever 62 is an example of retrieval means of the present invention. The summary coverage determiner 63 is an example of determining means of the present invention. The threshold value setter 64 is an example of determination means, first setting means, second setting means, and third setting means of the present invention. The summary generator 65 is an example of generating means of the present invention.

The content presenter 61 causes content selected by the user operating the input unit 1 to be displayed on the display screen of the display unit 2. For example, the content is displayed one or two pages at a time on the display screen. Thus, the content is presented to the user. When the content is presented to the user again, the content presenter 61 causes the content to be displayed, for example, from the last viewing end position.

When the content is presented to the user of the terminal Tn again, the viewing history retriever 62 retrieves the last viewing end date and time and the last viewing end position that are associated with the content ID of the content from the viewing history table. When the summary coverage determiner 43 performs a process on a daily basis, the viewing history retriever 62 may retrieve only the viewing end time included in the viewing end date and time.

From among a plurality of texts contained in the content to be presented, the summary coverage determiner 43 determines a range that is based on the last viewing end position retrieved by the viewing history retriever 62 (hereinafter, simply the "last viewing end position") and that depends on the elapsed time from the last viewing end date and time retrieved by the viewing history retriever 62 (hereinafter, simply the "last viewing end date and time") to the current time, to be coverage for generating a summary of the content (also referred to as summary coverage). There is a correlation between human memory and elapsed time. Thus, by determining a range dependent on the elapsed time to be summary coverage, a range that appropriately supplements information a person remembers can be set as appropriate coverage for generating a summary. For example, when a short time has elapsed since the last viewing end date and time, there is a high probability that the user remembers what the content contains more clearly than when a long time has elapsed. Thus, the coverage of a summary to be presented to the user is set narrow. On the other hand, when a long time has elapsed since the last viewing end date and time, there is a high probability that the user remembers what the content contains less clearly than when a short time has elapsed. Thus, the coverage of a summary to be presented to the user is set wide.

The range dependent on the last viewing end position is, for example, a range of several pages (paragraphs or lines) starting backward (e.g., in the direction from a high-numbered page to a low-numbered page) relative to the last viewing end position. Such a range corresponds to, for example, a range of several pages starting backward from the page (paragraph or line) that is the last viewing end position used as a reference, or a range of several pages starting backward from the page before the page corresponding to the last viewing end position used as a reference. How many pages (paragraphs or lines) to go back relative to the last viewing end position is determined depending on the above elapsed time. That is, the longer the elapsed time is, the more pages it is determined to go back. In this case, the summary coverage determiner 43 may determine the coverage, based on the segment ranges divided using the above-described segment unit. Generating a summary based on the texts contained in such a segment range can generate a better-organized summary. The segment unit may be any unit of "Part, Chapter, Section, and Clause". The widths of segment ranges divided using a segment unit vary depending on whether the type of the segment unit is Part, Chapter, Section, or Clause. Thus, more appropriately-sized coverage can be set depending on the elapsed time from the last viewing end date and time to the current time. Which segment unit to be used to determine the coverage may be set, for example, depending on the elapsed time from the last viewing end date and time to the current time. For example, which segment unit to be used may be set depending on whether the elapsed time is greater than or equal to a threshold value (first threshold value). Thus, which segment unit to be used can be appropriately set depending on the elapsed time from the last viewing end date and time to the current time. It is preferable that the above threshold value be set into a plurality of levels.

The threshold value setter 64 sets or changes various threshold values. This allows more appropriate coverage to be set in accordance with how the user has viewed content. Examples of a genre to which content belongs include history, mystery, science, and nonfiction. The threshold value setter 64 may determine whether, after viewing a summary of content, the user performed an operation to return to a text that the user had already viewed, based on the content viewing history retrieved by the viewing history retriever 62. In this case, if it determines that the user performed the operation to return to the text that the user had already viewed, the threshold value setter 64 sets the above threshold values smaller than their default values. For example, the threshold value setter 64 may set or change the above threshold values for each piece of content on which it is determined that, after viewing a summary of the content, the user performed an operation to return to a text that the user had already viewed or for each genre to which the content belongs, based on the content viewing history retrieved by the viewing history retriever 62. The threshold value setter 64 may determine whether the user of the terminal Tn attaches importance to summaries, based on the summary viewing history retrieved by the viewing history retriever 62. In this case, if it determines that the user does not attach importance to summaries, the threshold value setter 64 sets the above threshold values greater than their default values.

The summary generator 65 generates a summary of the coverage determined by the summary coverage determiner 43. The summary presenter 66 causes the summary generated by the summary generator 65 to be displayed on the display screen of the display unit 2. Thus, the summary of the content is presented to the user. The summary of the content is displayed before the content is presented to the user. Alternatively, the summary of the content is displayed overlaying the page that is the last viewing end position of the content.

2. How Terminal Tn Works

Figure 6:
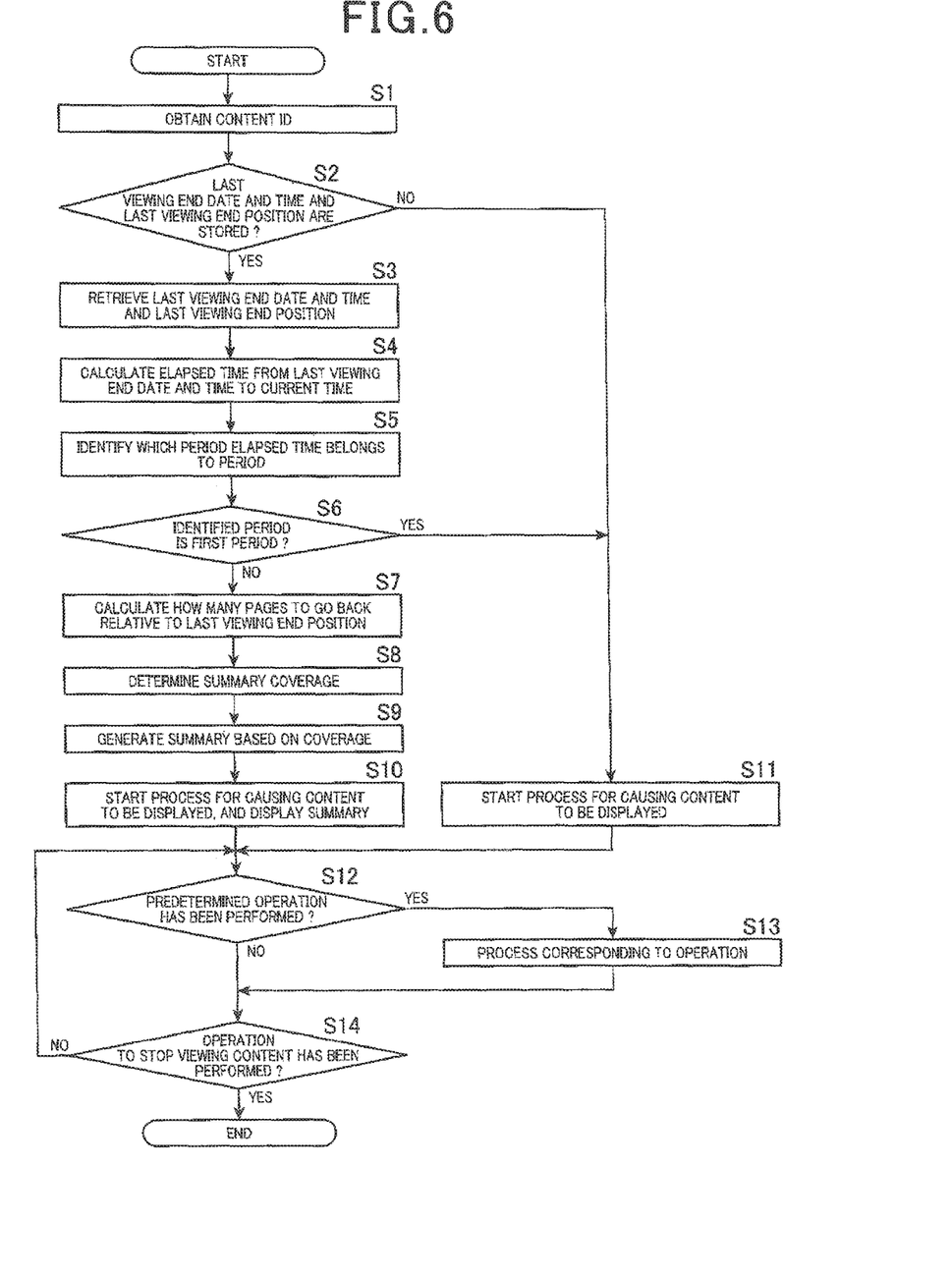
FIG. 6 is a flowchart showing an example of a content presentation process performed by the system controller 6 of the terminal T1.

The following describes an example operation of the terminal Tn according to this embodiment with reference to FIGS. 5 and 6. In the following example operation, a plurality of levels of set threshold values are used to determine coverage for generating a summary of content. FIG. 5A is a diagram showing an example setting for threshold values a to d. The threshold values a, b, c, and d are each an example of the first threshold value. FIGS. 5B to 5F are each a diagram showing example information indicating the correspondence between a period corresponding to each of a plurality of levels of set threshold ranges and parameters for the period. The period corresponding to each threshold range is a period between a plurality of mutually different first threshold values (the threshold values a, b, c, and d, in this example). In the example of FIG. 5B, each of the first to fifth periods different from each other is associated with a unit time and the number of pages per unit time as parameters therefor. In the examples of FIGS. 5B and 5F, no segment unit is used. On the other hand, in the examples of FIGS. 5C to 5E, each of the first to fifth periods is associated with a unit time, the number of pages per unit time, and a segment unit as parameters therefor. Also in the examples of FIGS. 5C to 5E, different segment units are set depending on the elapsed time from the last viewing end date and time to the current time. Also in the example of FIG. 5D, each number of pages per unit time is weighted based on the corresponding period. Further in the examples of FIGS. 5E and 5F, each unit time and the corresponding number of pages per unit time are weighted based on the corresponding period. The above information indicating the correspondence between each period and the corresponding parameters may be stored in a table form or written in the content presentation program. The above-described threshold values, periods, unit times, numbers of pages per unit time, segment units, weights based on the corresponding periods are set, for example, by the threshold value setter 64.

FIG. 6 is a flowchart showing an example of the content presentation process performed by the system controller 6 of the terminal T1. For example, the process shown in FIG. 6 is initiated in response to an operation of the input unit 1 by a user and is started when the user has selected desired content from a content list displayed on the display screen of the display unit 2.

When the process shown in FIG. 6 is started, the system controller 6 obtains the content of the content selected by the user (Step S1). At this time, the system controller 6 inserts a new record into the viewing history table and stores the content ID in the record. Subsequently, the system controller 6 determines whether the last viewing end date and time and the last viewing end position that are associated with the content ID obtained in Step S1 are stored in the viewing history table (Step S2). For example, when the content is presented to the user for the first time, the last viewing end date and time and the last viewing end position are not stored in the viewing history table. In this case, it is determined that the last viewing end date and time and the last viewing end position are not stored in the viewing history table (NO in Step S2), the process proceeds to Step S11. In Step S11, the system controller 6 starts a process for causing the content selected by the user to be displayed. On the other hand, if it is determined that the last viewing end date and time and the last viewing end position are stored in the viewing history table (YES in Step S2), the process proceeds to Step S3.

In Step S3, the system controller 6 (the viewing history retriever 62) retrieves the last viewing end date and time and the last viewing end position that are associated with the content ID obtained in Step S1 from the viewing history table. Then, the system controller 6 calculates the elapsed time from the last viewing end date and time retrieved in Step S3 to the current time, for example, obtained by the clock function (Step S4). The above coverage dependent on the elapsed time thus calculated is determined in the subsequent steps. At this time, the system controller 6 stores, in the record newly inserted into the viewing history table, the current date and time as a viewing start date and time in association with the above content ID. The system controller 6 also stores, in the record newly inserted into the viewing history table, the elapsed time calculated in Step S4 in association with the above content ID.

Although it is configured that the last viewing end date and time (i.e., the viewing end date and time nearest to the current time) that is associated with the content ID is retrieved in the above Step S3, it may be configured that the viewing end date and time before the last viewing end date and time is retrieved instead of the last viewing end date and time when the last viewing time of the content is short or when the last viewing amount of the content is small. For example, before Step S3, the system controller 6 retrieves the last viewing time (content viewing time) or the last viewing amount (content viewing amount) that is associated with the content ID from the viewing history table. Then, the system controller 6 determines whether the retrieved last viewing time is less than or equal to a threshold value (e.g., 10 minutes). This threshold value is an example of a second threshold value. Alternatively, the system controller 6 determines whether the retrieved last viewing amount is less than or equal to a threshold value (e.g., 10 pages). This threshold value is an example of the second threshold value. This threshold value is set, for example, by the system controller 6, based on the user's average content viewing time or average content viewing amount. Thus allows more appropriate coverage to be determined in accordance with the user's viewing status. This threshold value may be freely selected. Then, if it determines that the retrieved last viewing time or the retrieved last viewing amount is not less than or equal to the threshold value, the system controller 6 retrieves the last viewing end date and time and the last viewing end position that are associated with the content ID obtained in Step S1 from the viewing history table, and performs Step S4 in the same manner as described above.

On the other hand, if it determines that the retrieved last viewing time or the retrieved last viewing amount is less than or equal to the threshold value, the system controller 6 retrieves the second last viewing end date and time before the last viewing end time, from among a plurality of viewing end dates and times that are associated with the content ID, and the last viewing end position (or the second last viewing end position) (Step S3). For example, assuming that "5 minutes" in the record No. 3 is retrieved as the last viewing time of the content whose content ID is "a-123" from the viewing history table shown in FIG. 4, the retrieved last viewing time is less than or equal to the threshold value (e.g., 10 minutes). Thus, in this case, the second last viewing end date and time "2013/9/2 9:00" is retrieved, instead of the last viewing end date and time "2013/9/2 12:50". Then, the system controller 6 calculates the elapsed time from the retrieved second last viewing end date and time to the current time (Step S4), and determines the above coverage dependent on the elapsed time in the subsequent steps. This allows appropriate coverage that depends on the content viewing time or the content viewing amount to be set. If it determines that the retrieved last viewing time or the retrieved last viewing amount is less than or equal to the threshold value, the system controller 6 may further determines whether the second last viewing time or the second last viewing amount is less than or equal to the threshold value. If the second last viewing time or the second last viewing amount is less than or equal to the threshold value, the system controller 6 may retrieve the viewing end date and time before the second last viewing end date and time and perform the above process.

Subsequently, the system controller 6 identifies which period (e.g., one of the first to fifth periods) the elapsed time calculated in Step S4 belongs to, by using the above-described information indicating correspondence between each period and the corresponding parameters (any one of FIGS. 5B to 5F) (Step S5). The system controller 6 may perform a threshold value change setting process before performing Step 5. In the threshold value change setting process, the system controller 6 retrieves, from the viewing history table, the information about whether a backward operation was performed after summary viewing that is associated with the content ID obtained in Step S1. Based on the information about whether a backward operation was performed after summary viewing, the system controller 6 determines whether, after viewing a summary of the content, the user performed an operation to return to a page that the user had already viewed. For example, if the information about whether a backward operation was performed after summary viewing is "performed", the system controller 6 determines that, after viewing the summary of the content, the user performed the operation to return to the page that the user had already viewed. Then, if it determines that the user performed the operation to return to the page that the user had already viewed, the system controller 6 sets the above threshold values smaller than their default values (e.g., the threshold values a to d shown in FIG. 5A). The fact that the user performed the backward operation means that the summary the user viewed did not provide enough information. Thus, setting the above threshold values smaller than their default values allows appropriate coverage that depends, for example, on differences in memory among users or on the condition of the user who is viewing the content to be set.

Alternatively, in the threshold value change setting process, the system controller 6 may retrieve the summary viewing time associated with the content ID obtained in Step S1, from the viewing history table. In this case, the system controller 6 may determine whether the user of the terminal Tn attaches importance to summaries, based on the summary viewing time. For example, when display of a summary is canceled in response to an operation of the input unit 1 by the user just after the summary is displayed or when display of a summary is skipped, the summary viewing time is short. Thus, when the summary viewing time is less than or equal to, for example, 1 to 2 seconds, the system controller 6 determines that the user does not attach importance to summaries, and sets the above threshold values greater than their default values (e.g., the threshold values a to d shown in FIG. 5A). This allows coverage that makes summaries more necessary for the user to be set.

Subsequently, the system controller 6 determines whether the period identified in Step S5 is the first period (Step S6).

As a first case, assuming that "2013/9/5 7:30" in the record No. 8 is retrieved as the last viewing end date and time of the content whose content ID is "a-123" from the viewing history table shown in FIG. 4 and that the current time is "2013/9/5 8:00", the elapsed time is 30 minutes. Thus, the period to which the elapsed time belongs is the first period. In this case, it is determined that the period identified in Step S5 is the first period (YES in Step S6), the process proceeds to Step S11. That is, in this case, the elapsed time is short, and thus coverage for generating a summary of the content is not determined.

As a second case, assuming that "2013/9/2 9:00" in the record No. 2 is retrieved as the last viewing end date and time of the content whose content ID is "a-123" from the viewing history table shown in FIG. 4 and that the current time is "2013/9/2 12:45", the elapsed time is 3 hours and 45 minutes. Thus, the period to which the elapsed time belongs is the second period. In this case, it is determined that the period identified in Step S5 is not the first period (NO in Step S6), the process proceeds to Step S7.

As a third case, assuming that "2013/9/1 20:00" in the record No. 1 is retrieved as the last viewing end date and time of the content whose content ID is "a-123" fromthe viewing history table shown in FIG. 4 and that the current time is "2013/9/2 8:00", the elapsed time is 12 hours. Thus, the period to which the elapsed time belongs is the third period. In this case, it is determined that the period identified in Step S5 is not the first period (NO in Step S6), the process proceeds to Step S7.

As a fourth case, assuming that "2013/9/18 23:00" in the record No. 21 is retrieved as the last viewing end date and time of the content whose content ID is "a-123" from the viewing history table shown in FIG. 4 and that the current time is "2013/9/20 7:00", the elapsed time is 32 hours. Thus, the period to which the elapsed time belongs is the fourth period. In this case, it is determined that the period identified in Step S5 is not the first period (NO in Step S6), the process proceeds to Step S7.

In Step S7, the system controller 6 calculates how many pages to go back relative to the last viewing end position retrieved in Step S3, based on the elapsed time calculated in Step S4 and on the parameters associated with the period 3C identified in Step S5. For example, the number of pages to go back is calculated by the following equation.

$$\text{the number of pages to go back} = (\text{elapsed time/unit time}) \times \text{the number of pages per unit time} \quad \text{(Equation)}$$

Using this equation, the system controller 6 multiplies the value obtained by dividing the above elapsed time by the unit time associated with the period to which the elapsed time belongs and the number of pages per unit time (an example of the first number of structural units) associated with the period, to calculate the number of pages (an example of the second number of structural units).

Subsequently, the system controller 6 (summary coverage determiner 43) determines a range of the number of pages calculated in Step S7 starting backward relative to the last viewing end position obtained in Step S3 to be the coverage of a summary of the content (i.e., the content that is assigned the content ID obtained in Step S1) (Step S8). At this time, the system controller 6 may determine the coverage, based on the structural data of the content that is assigned the content ID obtained in Step S1 and on segment ranges divided using a segment unit. For example, when using the information indicating the correspondences shown in FIG. 5C to 5E, the system controller 6 sets a segment unit, depending on the elapsed time from the last viewing end date and time to the current time, and determines the coverage using the set segment unit. That is, the coverage is determined based on the segment ranges divided using the set segment unit.

A specific example of coverage to be determined in each of the second to fourth cases described above is now described.

Second Case

In the second case, for example, "page 61" in the record No. 2 is retrieved as the last viewing end position of the content whose content ID is "a-123" from the viewing history table shown in FIG. 4. Also in the second case, even when any piece of the information indicating the correspondences shown in FIGS. 5B to 5F is used, in Step S7, the number of pages to go back is calculated to be 3.75×5 (pages)=18.75≈19 (or rounded down to 18). Then, when the information indicating the correspondences shown in FIGS. 5B and 5F is used, the range "pages 43 to 60" of 19 pages, calculated above, starting backward from the last viewing end position "page 61" is determined to be the coverage. Alternatively, the range "pages 42 to 60" of 19 pages, calculated above, starting backward from "page 60" before the last viewing end position "page 61" is determined to be the coverage.

On the other hand, when the information indicating the correspondences shown in FIGS. 5C to 5E is used, the range "pages 43 to 61" of 19 pages, described above, starting backward from the last viewing end position "page 61" is modified to be "pages 41 to 60" based on segment ranges divided using the segment unit "Clause" and on the structural data that specifies the structure of the content, for example, shown in FIG. 3, and then the modified "pages 41 to 60" is determined to be the coverage. That is, in the example of FIG. 3, the segment range divided using Chapter 1, Section 2, Clause 2 of the content is "pages 41 to 50". Thus, the first page of the above backward range "pages 43 to 61" is modified to be "page 41", which is the first page of the segment range. The segment range divided using Chapter 1, Section 2, Clause 3 of the content is "pages 51 to 60". Thus, the last page of the above backward range "pages 43 to 61" is modified to be "page 60", which is the last page of the segment range. The same applies to the range "pages 42 to 60" of 19 pages, described above, starting backward from the last viewing end position "page 60".

Third Case

In the third case, for example, "page 41" in the record No. 1 is retrieved as the last viewing end position of the content whose content ID is "a-123" from the viewing history table shown in FIG. 4. Also in the third case, when the information indicating the correspondences shown in FIGS. 5B and 5C is used, in Step S7, the number of pages to go back is calculated to be 12×5 (pages)=60. On the other hand, when the information indicating the correspondence shown in FIG. 5D is used, in Step S7, the number of pages to go back is calculated to be 12×10 (pages)=120. The reason is that the number of pages per unit time associated with the third period is weighted based on the third period. In this example, the number of pages per unit time "5 pages" is weighted by "2", and thus the number of pages per unit time is 10 pages. That is, among the plurality of periods, a period to which a relatively long elapsed time belongs is assigned more pages than a period to which a relatively short elapsed time belongs. This weighting allows coverage appropriate for each user to be set depending on the elapsed time. On the other hand, when the information indicating the correspondences shown in FIGS. 5E and 5F is used, in Step S7, the number of pages to go back is calculated to be 6×15 (pages)=90. The reason is that the unit time and the number of pages per unit time that are associated with the third period are weighted based on the third period. Then, when the information indicating the correspondence shown in FIG. 5B is used, the page that is 60 pages, calculated above, before the last viewing end position "page 41" is less than or equal to "page 1", and thus "pages 1 to 41" is determined to be the coverage. Alternatively, the range "pages 1 to 40" starting backward from "page 40" before the last viewing end position "page 41" is determined to be the coverage. Also when the information indicating the correspondences shown in FIG. 5F is used, "pages 1 to 41" is determined to be the coverage. Alternatively, the range "pages 1 to 40" starting backward from "page 40" before the last viewing end position "page 41" is determined to be the coverage.

On the other hand, when the information indicating the correspondences shown in FIGS. 5C to 5E is used, the range "pages 1 to 41" starting backward from the last viewing end position "page 41" is modified to be "pages 1 to 40" based on the segment ranges divided using the segment unit "Clause" and on the structural data that specifies the structure of the content, for example, shown in FIG. 3, and then the modified "pages 1 to 40" is determined to be the coverage. That is, the segment range divided using Chapter 1, Section 2, Clause 1 of the content is "pages 31 to 40". Thus, the last page of the above backward range "pages 1 to 41" is modified to be "page 40", which is the last page of the segment range.

Fourth Case

In the fourth case, for example, "page 345" in the record No. 22 is retrieved as the last viewing end position of the content whose content ID is "a-123" from the viewing history table shown in FIG. 4. Also in the fourth case, when the information indicating the correspondences shown in FIGS. 5B and 5C is used, in Step S7, the number of pages to go back is calculated to be 32×5 (pages)=160. On the other hand, when the information indicating the correspondence shown in FIG. 5D is used, in Step S7, the number of pages to go back is calculated to be 32×15 (pages)=480, because the number of pages per unit time associated with the fourth period is weighted. On the other hand, when the information indicating the correspondences shown in FIGS. 5E and 5F is used, in Step S7, the number of pages to go back is calculated to be 10.666×25 (pages)=266.665≈267 (or rounded down to 266), because the unit time and the number of pages per unit time that are associated with the fourth period are each weighted. Then, when the information indicating the correspondence shown in FIG. 5B is used, the range "pages 186 to 345" of 160 pages, calculated above, starting backward from the last viewing end position "page 345" is determined to be the coverage. Alternatively, the range "pages 185 to 344" of 160 pages, calculated above, starting backward from "page 344" before the last viewing end position "page 345" is determined to be the coverage. On the other hand, when the information indicating the correspondence shown in FIG. 5F is used, the range "pages 79 to 345" of 267 pages, calculated above, starting backward from the last viewing end position "page 345" is determined to be the coverage. Alternatively, the range "pages 78 to 344" of 267 pages, calculated above, starting backward from "page 344" before the last viewing end position "page 345" is determined to be the coverage.

On the other hand, when the information indicating the correspondence shown in FIG. 5C is used, the range "pages 186 to 345" of 160 pages, described above, starting backward from the last viewing end position "page 345" is modified to be "pages 181 to 330" based on segment ranges divided using the segment unit "Section" and on the structural data that specifies the structure of the content, for example, shown in FIG. 3, and then the modified "pages 181 to 330" is determined to be the coverage. That is, the segment range divided using Chapter 4, Section 1 of the content is "pages 181 to 210". Thus, the first page of the above backward range "pages 186 to 360" is modified to be "page 181", which is the first page of the segment range. The segment range divided using Chapter 6, Section 1 of the content is "pages 301 to 330". Thus, the last page of the above backward range "pages 186 to 345" is modified to be "page 330", which is the last page of the segment range. The range "pages 186 to 345" may be modified to be "pages 181 to 345" by using the segment range only for the first page, and then the modified "pages 181 to 345" may be determined to be the coverage.

On the other hand, when the information indicating the correspondence shown in FIG. 5D is used, the page that is 480 pages, described above, before the last viewing end position "page 345" is less than or equal to "page 1". Thus, as in the case of FIG. 5C, "pages 1 to 345" is modified to be "pages 1 to 330" based on the segment ranges divided using the segment unit "Section" and on the structural data that specifies the structure of the content, for example, shown in FIG. 3, and then the modified "pages 1 to 330" is determined to be the coverage.

On the other hand, when the information indicating the correspondence shown in FIG. 5E is used, as in the case of FIG. 5C, the range "pages 79 to 345" of 267 pages, described above, starting backward from the last viewing end position "page 345" is modified to be "pages 61 to 330" based on the segment ranges divided using the segment unit "Section" and on the structural data that specifies the structure of the content, for example, shown in FIG. 3, and then the modified "pages 61 to 330" is determined to be the coverage. In this example, when the last viewing end position "page 345" is in the segment range "pages 331 to 360" divided using Chapter 6, Section 2 of the content, the segment range is not included in the above coverage, and the segment range "pages 301 to 330" just before the segment range "pages 331 to 360" is determined to be included in the above coverage. However, when the last viewing end position is in a specific segment range divided using a segment unit, the system controller 6 may determine whether to include the segment range in the coverage, based on at which position in the segment range the last viewing end position is.

For example, only when the last viewing end position is in a start portion (e.g., a portion of a first predetermined percentage, for example 20%, or less of the segment range from the beginning) of the segment range "pages 331 to 360" (an example of the specific segment range), the segment range is not included in the above coverage, and the segment range "pages 301 to 330" just before the segment range "pages 331 to 360" may be determined to be included in the above coverage. When the last viewing end position is in the start portion of the specific segment range, the user has not viewed most of the range. Thus, it will cause inconvenience to include the range in the above coverage. On the other hand, in this case, for example, when the last viewing end position is not in the start portion of the specific segment range "pages 331 to 360", the above coverage "pages 61 to 360" including the segment range "pages 331 to 360" is determined.

Alternatively, only when the last viewing end position is in an end portion (e.g., a portion of a second predetermined percentage, for example 90%, or more of the segment range away from the beginning) of the segment range "pages 331 to 360", the segment range "pages 331 to 360" may be determined to be included in the above coverage. When the last viewing end position is in the end portion of the specific segment range, it will not cause any inconvenience to include a portion that the user has not viewed in the above coverage, but rather enables the user to easily remember what he or she viewed last. This allows appropriate coverage to be set based on the last viewing end position. On the other hand, in this case, when the last viewing end position is not in the end portion of the specific segment range "pages 331 to 360", the segment range is not included in the above coverage, and the segment range "pages 301 to 330" just before the segment range "pages 331 to 360" is determined to be included in the above coverage.

Subsequently, the system controller 6 (the summary generator 65) generates a summary based on the coverage determined in Step S8 (Step S9). For example, the system controller 6 identifies nouns (e.g., people, things, companies, and events (e.g., incidents)) from the texts included in the determined coverage, and generates a summary of the coverage by using the identified nouns. More specifically, the system controller 6 extracts a predetermined number or less of texts that include the above identified nouns, and generates the extracted texts as the summary. Alternatively, the system controller 6 may extract a predetermined number or less of texts that include the above identified nouns, further extract texts that include the above nouns as their subjects from the extracted texts, and generate the extracted texts as the summary. The system controller 6 may generate the summary from the texts included in the coverage using a known method.

The system controller 6 may be configured to obtain a current estimated viewing range of the content that is assigned the content ID obtained in Step S1 and to identify nouns (e.g., people, things, companies, and events (e.g., incidents)) from the current estimated viewing range as well as the above determined coverage. In this case, by using nouns included both in the texts of the current estimated viewing range and in the texts of the above determined coverage, the system controller 6 generates a summary of the coverage. This generates a summary of what the user has already viewed about, for example, people, things, companies, and events (e.g., incidents) included both in the range that the user has already viewed (e.g., a range, such as Part, Chapter, Section, or Clause, set according to the above-described threshold values) and in the range that the user is about to view, thus generating a summary that allows the user to easily enter into what he or she is about to view. The current estimated viewing range is, for example, the average of the previous viewing amounts (the viewing history table or retrieved viewing amounts) associated with the content ID obtained in Step S1, that is, the average of the viewing amounts of the same content in a plurality of records. Alternatively, the current estimated viewing range may be the average of the content viewing amounts of all content that belongs to a genre to which the content that is assigned the content ID obtained in Step S1 belongs, that is, the average of the content viewing amounts of all content that belongs to the same genre. Alternatively, the current estimated viewing range may be the average of the content viewing amounts of all content that belongs to the same genre and that were viewed during a predetermined period of time. The predetermined period of time is, for example, freely selected.

Subsequently, the system controller 6 (the content presenter 61 and the summary presenter 66) starts a process for causing the content selected by the user to be displayed and causes the summary generated in Step S9 to be displayed on the display screen of the display unit 2 (Step S10). For example, the system controller 6 causes the generated summary to be displayed overlaying the page that is the last viewing end position of the content. At this time, the system controller 6 stores, in the record newly inserted into the viewing history table, a viewing start position in association with the above content ID.

Next, the system controller 6 determines whether the user has performed a predetermined operation of the input unit 1 (Step S12). Examples of this predetermined operation include a page forward operation, a page backward operation, an operation to cancel display of a summary, and an operation to skip display of a summary. Then, when it is determined that the user has performed an operation of the input unit 1 (YES in Step S12), the system controller 6 performs a process corresponding to the operation (Step S13). If the predetermined operation is a page backward operation after the summary is displayed, the system controller 6 stores, in the record newly inserted into the viewing history table, the information about whether a backward operation was performed after summary viewing "performed" in association with the above content ID. The system controller 6 also measures how long the summary remains displayed and stores, in the record newly inserted into the viewing history table, a summary viewing time in association with the above content ID. On the other hand, if it is determined that the user has performed no operation of the input unit 1 (NO in Step S12), the process proceeds to Step S14.

In Step S14, the system controller 6 determines whether the user has performed an operation to stop viewing the content. If it is determined that the user has performed the operation to stop viewing the content (YES in Step S14), the system controller 6 terminates the content presentation process shown in FIG. 6. At this time, the system controller 6 stores, in the record newly inserted into the viewing history table, a viewing end position, a viewing end time, a content viewing time, and a content viewing amount in association with the above content ID. On the other hand, if it is determined that the user has performed no operation to stop viewing the content (NO in Step S14), the process returns to Step S12 and continues.

As described above, according to the above embodiment, from among a plurality of texts contained in content to be presented to a user, it is configured that the range that is based on the last viewing end position and that depends on the elapsed time from the last viewing end date and time to the current time is determined to be coverage for generating a summary of the content. Thus, a range that appropriately supplements information a person remembers can be set as appropriate coverage for generating a summary.

The functions of the viewing history retriever 62, the summary coverage determiner 43, the threshold value setter 64, and the summary generator 65, which are described above, may be implemented in a processor of the content providing server SA. In this case, the content providing server SA retrieves the last viewing end date and time and the last viewing end position that are associated with the content ID of content selected by the user of the terminal Tn from the viewing history table stored in a memory of the content providing server SA. From among a plurality of texts contained in the content, the content providing server SA determines a range that is based on the last viewing end position and that depends on the elapsed time from the last viewing end date and time to the current time, to be coverage for generating a summary of the content. Then, the content providing server SA generates a summary of the determined coverage and presents the generated summary via the terminal Tn.

Although electronic book content is taken as an example in the above embodiment, the present invention can also be applied to content other than the electronic book content. For example, the present invention can also be applied to web information, such as a serial column, and information searches, such as item searches. For example, when the present invention is applied to web information as content, a predetermined server stores a viewing end date and time for each predetermined URL. When obtaining a retrieval request for related pieces of web information from a terminal, the server determines a range (web information) that is based on the web information at which the last viewing ended (an example of the last viewing end position) and that depends on the elapsed time since the viewing end date and time to be summary coverage, and generates a summary of the determined coverage. The related pieces of web information have, for example, the same domain or the same domain and directory in their URLs. Alternatively, for example, when the present invention is provided to log information retrieved by an information search as content, a predetermined server stores, for each query or each group of related queries, log information (e.g., viewed item information) and a viewing end date and time in association with each other. When obtaining a new query from a terminal, the server determines a range (log information) that is based on the log information at which the last viewing ended (an example of the last viewing end position) and that depends on the elapsed time since the viewing end date and time to be summary coverage, and generates a summary of the determined coverage. When an information search based on a query leads a user to purchase of an item, the log information of the corresponding query is reset.

REFERENCE SIGNS LIST

SA content providing server
Tn terminal
1 input unit
2 display unit
3 communication unit
4 storage unit
5 input/output interface unit
6 system controller
NW network
S content providing system

The invention claimed is:

1. A computer architecture comprising:
at least one storage memory that stores a viewing end time of content and a viewing end position in the content in association with identification information of the content, the content containing a plurality of viewing elements viewable to a user, some of the viewing elements being to be presented to the user at a time;
at least one memory that stores computer program code; and
at least one processor configured to access said computer program code and operate as instructed by said computer program code, said computer program code comprising:
retrieval code configured to cause at least one of said at least one processor to retrieve, when the content is presented to the user again, the viewing end time and the viewing end position that are associated with the identification information of the content, and the user's viewing history of summaries of predetermined content;

determining code configured to cause at least one of said at least one processor to determine a range, from among a plurality of viewing elements contained in the content, to be coverage, the range being based on the viewing end position retrieved by the retrieval code and being dependent on an elapsed time from the viewing end time retrieved by the retrieval code to a current time; and generating code configured to cause at least one of said at least one processor to generate a summary of the content, the summary comprising texts extracted from the content based on the range determined by the determining code, wherein the determining code is further configured to cause at least one of said at least one processor to set a segment unit by which a plurality of viewing elements contained in the content are divided, depending on whether the elapsed time is greater than or equal to a first threshold value set based on the viewing history of summaries, and determine the coverage using the set segment unit.

2. The computer architecture according to claim 1, wherein when the viewing end position retrieved by the retrieval code is in a specific segment range divided using the segment unit, the determining code is further configured to cause at least one of said at least one processor to determine whether to include the specific segment range in the coverage, based on at which position in the specific segment range the viewing end position is.

3. The computer architecture according to claim 1, wherein the plurality of viewing elements are divisible into a plurality of structural units, the at least one storage memory stores each of a plurality of mutually different periods that are each between a plurality of mutually different first threshold values, a unit time, and a first number of structural units per the unit time in association with each other, and when the elapsed time belongs to any of the periods, the determining code is further configured to cause at least one of said at least one processor to multiply a value obtained by dividing the elapsed time by the unit time associated with the period and the first number of structural units associated with the period to calculate a second number of structural units, and determine a range of the second number of structural units starting backward relative to the viewing end position to be the coverage.

4. The computer architecture according to claim 3, wherein among the plurality of periods, the period to which the elapsed time being relatively long belongs is assigned the greater first number of structural units than the period to which the elapsed time being relatively short belongs.

5. The computer architecture according to claim 1, further comprising:

determination code configured to cause at least one of said at least one processor to determine whether the user attaches importance to summaries, based on the viewing history retrieved by the retrieval code; and first setting code configured to cause at least one of said at least one processor to set the first threshold value greater than a default value, if the determination code causes said at least one processor to determine that the user does not attach importance to summaries.

6. The computer architecture according to claim 1, wherein the computer architecture further comprises:

determination code configured to cause at least one of said at least one processor to determine whether, after viewing a summary of the predetermined content, the user performed an operation to return to the viewing element that the user had already viewed, based on the viewing history retrieved by the retrieval code; and first setting code configured to cause at least one of said at least one processor to set the first threshold value smaller than a default value, if the determination code causes said at least one processor to determine that the user performed the operation to return to the viewing element that the user had already viewed.

7. The computer architecture according to claim 1, comprising:

second setting code configured to cause at least one of said at least one processor to set or change the first threshold value for each piece of content on which it is determined that the user performed the operation to return to the viewing element that the user had already viewed or for each genre to which the content belongs, based on the user's viewing history of the predetermined content.

8. The method of claim 1, wherein the extracted texts comprise a noun.

9. The method of claim 8, wherein the noun is a subject in the extracted texts.

10. The method of claim 9, wherein the summary of the content comprises the noun.

11. A computer architecture comprising:

at least one storage memory that stores a plurality of viewing end times of content, wherein the plurality of viewing end times comprises a last viewing end time and a second-to-last viewing end time, and a viewing end position in the content in association with identification information of the content, the content containing a plurality of viewing elements viewable to a user, some of the viewing elements being to be presented to the user at a time;

at least one memory that stores computer program code; and at least one processor configured to access said computer program code and operate as instructed by said computer program code, said computer program code comprising:

retrieval code configured to cause at least one of said at least one processor to retrieve, when the content is presented to the user again, the last or second-to-last viewing end time and the viewing end position that are associated with the identification information of the content, and a last viewing duration or a last viewing amount of the content;

determining code configured to cause at least one of said at least one processor to determine a first range or a second range, from among a plurality of viewing elements contained in the content, to be coverage; and generating code configured to cause at least one of said at least one processor to generate a summary of the content, the summary comprising texts extracted from the content based on the first range or the second range determined by the determining code, wherein, when the last viewing duration or the last viewing amount that is retrieved by the retrieval code is more than a second threshold value, the determining code is further configured to cause at least one of said at least one processor to determine the first range, wherein the first range is based on the viewing end position retrieved by the retrieval code and based on an elapsed time from the last viewing end time retrieved by the retrieval code to a current time, and wherein, when the last viewing duration or the last viewing amount that is retrieved by the retrieval code is less than or equal to the second threshold value, the determining code is further configured to cause at least one of said at least one processor to determine the second range, wherein the second range is based on a second elapsed time from the second-to-last viewing end time retrieved by the retrieval code to the current time.

12. The computer architecture according to claim 11, wherein the plurality of viewing elements are divisible into a plurality of structural units, the at least one storage memory stores each of a plurality of mutually different periods that are each between a plurality of mutually different first threshold values, a unit time, and a first number of structural units per the unit time in association with each other, and when the elapsed time belongs to any of the periods, the determining code is further configured to cause at least one of said at least one processor to multiply a value obtained by dividing the elapsed time by the unit time associated with the period and the first number of structural units associated with the period to calculate a second number of structural units, and determine a range of the second number of structural units starting backward relative to the viewing end position to be the coverage.

13. The computer architecture according to claim 12, wherein among the plurality of periods, the period to which the elapsed time being relatively long belongs is assigned the greater first number of structural units than the period to which the elapsed time being relatively short belongs.

14. The computer architecture according to claim 11, comprising:

third setting code configured to cause at least one of said at least one processor to set the second threshold value, based on the user's average content viewing duration or average content viewing amount.

15. A computer architecture comprising:

at least one storage memory that stores a viewing end time of content and a viewing end position in the content in association with identification information of the content, the content containing a plurality of viewing elements viewable to a user, some of the viewing elements being to be presented to the user at a time;

at least one memory that stores computer program code; and at least one processor configured to access said computer program code and operate as instructed by said computer program code, said computer program code comprising:

retrieval code configured to cause at least one of said at least one processor to retrieve, when the content is presented to the user again, the viewing end time and the viewing end position that are associated with the identification information of the content, and a current estimated viewing range of the content;

i) determine a range, from among a plurality of viewing elements contained in the content, to be coverage, the range being based on the viewing end position retrieved by the retrieval code and being dependent on an elapsed time from the viewing end time retrieved by the retrieval code to a current time, and generating code configured to cause at least one of said at least one processor to generate a summary of the content determined by the determining code, the summary comprising nouns included both in the viewing elements of the estimated viewing range retrieved by the retrieval code and in the viewing elements of the coverage, wherein the plurality of viewing elements are divisible into a plurality of structural units, the at least one storage memory stores each of a plurality of mutually different periods that are each between a plurality of mutually different first threshold values, a unit time, and a first number of structural units per the unit time in association with each other, and when the elapsed time belongs to any of the periods, the determining code is further configured to cause at least one of said at least one processor to multiply a value obtained by dividing the elapsed time by the unit time associated with the period and the first number of structural units associated with the period to calculate a second number of structural units, and determine a range of the second number of structural units starting backward relative to the viewing end position to be the coverage.

16. The computer architecture according to claim 15, wherein among the plurality of periods, the period to which the elapsed time being relatively long belongs is assigned the greater first number of structural units than the period to which the elapsed time being relatively short belongs.

17. An information processing method performed by a computer, wherein the computer includes at least one storage memory and at least one processor, the method comprising:

storing a viewing end time of content and a viewing end position in the content in association with identification information of the content, the content containing a plurality of viewing elements viewable to a user, some of the viewing elements being to be presented to the user at a time;

retrieving, when the content is presented to the user again, the viewing end time and the viewing end position that are associated with the identification information of the content, and the user's viewing history of summaries of predetermined content;

determining a range, from among a plurality of viewing elements contained in the content, to be coverage, the range being based on the viewing end position and being dependent on an elapsed time from the viewing end time to a current time; and generating the summary of the content, the summary comprising texts extracted from the content, based on the determined range, wherein the determining sets a segment unit by which a plurality of viewing elements contained in the content are divided, depending on whether the elapsed time is greater than or equal to a first threshold value set based on the viewing history of summaries, and determines the coverage using the set segment unit.

18. An information processing method performed by a computer, wherein the computer includes at least one storage memory and at least one processor, the method comprising:

storing a viewing end time of content and a viewing end position in the content in association with identification information of the content, the content containing a plurality of viewing elements viewable to a user, some of the viewing elements being to be presented to the user at a time;

retrieving, when the content is presented to the user again, the viewing end time and the viewing end position that are associated with the identification information of the content, and a last viewing duration or a last viewing amount of the content;

determining a range, from among a plurality of viewing elements contained in the content, to be coverage, the range being based on the viewing end position and being dependent on an elapsed time from the viewing end time to a current time; and generating the summary of the content, the summary comprising texts extracted from the content, based on the determined range, wherein, if the last viewing duration or the last viewing amount is less than or equal to a second threshold value, the determining determines the coverage dependent on an elapsed time from the viewing end time before the viewing end time nearest to the current time to the current time, among a plurality of the viewing end times associated with the identification information of the content.

19. An information processing method performed by a computer, the method comprising:

storing a viewing end time of content and a viewing end position in the content in association with identification information of the content, the content containing a plurality of viewing elements viewable to a user, some of the viewing elements being to be presented to the user at a time;

retrieving, when the content is presented to the user again, the viewing end time and the viewing end position that are associated with the identification information of the content, and a current estimated viewing range of the content;

determining a range, from among a plurality of viewing elements contained in the content, to be coverage, the range being based on the viewing end position and being dependent on an elapsed time from the viewing end time to a current time, wherein the plurality of viewing elements are divisible into a plurality of structural units;

generating a summary of the content, the summary comprising nouns included both in the viewing elements of the estimated viewing range and in the viewing elements of the coverage, storing each of a plurality of mutually different periods that are each between a plurality of mutually different first threshold values, a unit time, and a first number of structural units per the unit time in association with each other; and when the elapsed time belongs to any of the periods:
  multiplying a value obtained by dividing the elapsed time by the unit time associated with the period and the first number of structural units associated with the period to calculate a second number of structural units, and
  determining a range of the second number of structural units starting backward relative to the viewing end position to be the coverage.

* * * * *